Aug. 13, 1963 J. H. WESSEL 3,100,343
FRUIT CLIPPERS
Filed Sept. 25, 1961

JOHN H. WESSEL
INVENTOR.

BY Lyon & Lyon
ATTORNEYS.

United States Patent Office 3,100,343
Patented Aug. 13, 1963

3,100,343
FRUIT CLIPPERS
John H. Wessel, 3679 Fairview Drive, Vista, Calif.
Filed Sept. 25, 1961, Ser. No. 140,485
10 Claims. (Cl. 30—232)

The present invention relates generally to shears or clippers of the type used by fruit pickers in harvesting fruit from the trees. More particularly this invention relates to an improved type of fruit clipper in which some of the operator's fingers are free to grasp the fruit while the stem is cut, thereby requiring only one hand to pick the fruit.

One of the problems encountered when harvesting fruit from rather large trees, such as the avocado, is the difficulty of access to some of the fruit requiring the picker to reach some distance from his ladder or else climb up into the tree. It is highly preferable, of course, to clip the stem of the fruit rather than to pluck it from the tree as the latter method often causes damage to the fruit. The picker must therefore reach out and clip the fruit with one hand and at the same time hold it with the other so it won't fall and become bruised. He therefore needs to use both hands, but for fruit in remote positions this becomes a very hazardous operation, often resulting in falls and injuries.

It is an object, therefore, of this invention to provide a fruit clippers which allows the operator to grasp the fruit and to sever the stem thereof using only one hand.

It is a further object of this invention to provide a one handed fruit picking device which will not injure the fruit yet will contribute materially to the safety and economy of the picking operation.

Other important features and advantages which are believed to be novel are set forth in the appended claims. The invention itself, and further advantages thereof, may be more readily understood when read in connection with the accompanying drawings, in which:

Figure 1:
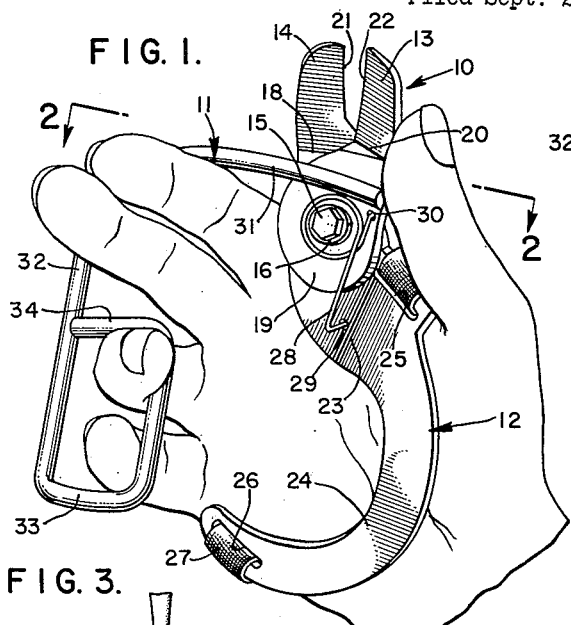
FIGURE 1 is a view showing the method of gripping the improved clipper device, and illustrating the freedom of fingers of the hand to grip the fruit.

Referring to the drawings, the improved clippers are generally denoted 10, including a pair of pivotal members or handles 11 and 12, and blades 13 and 14, said members or handles pivotally attached by the bolt 15, washer 16 and nut 17. The cutting blade 14 is formed integrally with the member 12 and is bent inwardly at 18 to form an obtuse angle with said member 12. The blade 13 is formed integrally with the pivotal member 19 to which is attached member or handle 11 and said blade 13 is bent inwardly at 20 the same as blade 14 so that the two blades are substantially parallel. The cutting edges of the blades 13 and 14 are designated 21 and 22 respectively.

Figure 4:
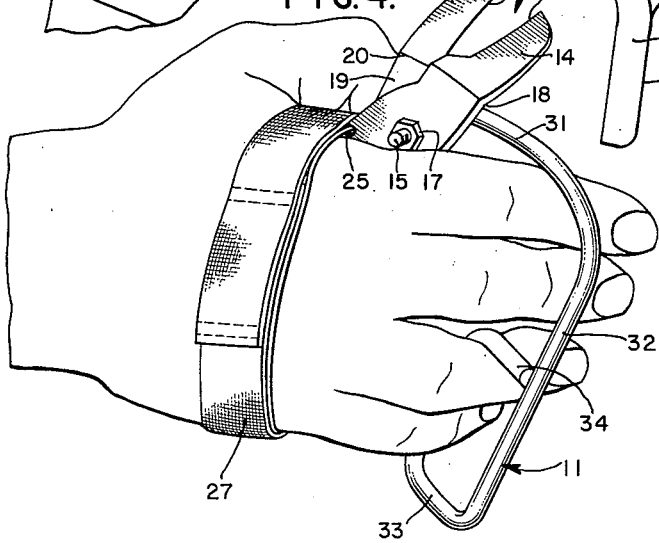
FIGURE 4 is a rear view of the improved clipper device showing the method of gripping the same.

The handle 12 is bent inwardly at 23 so that the heel of the operator's hand pushes against the flat rear side of the curved portion 24 when the handles are being brought together. Slots 25 and 26 are provided in the end portions of the handle 12 to receive the strap 27 forming a cord across the curved portion 24 and which fits over the back of the operator's hand and holds the clippers in the proper position as shown in FIGURES 1 and 4. In the position shown, the thumb is free to move independently of the position of the clippers since the movement of handle 12 is performed by the heel of the operator's hand. A return spring 28 is provided to open the clipper blades and is mounted in the aperture 29 in handle 12 and aperture 30 in pivotal member 19.

Figure 2:
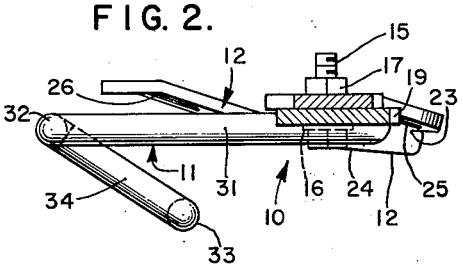
FIGURE 2 is an sectional end view taken substantially along line 2—2 of FIGURE 1 showing the offset or angular portions of the handles.

The member or handle 11 is secured to pivotal member 19 and has a transversely extending portion 31, a descending portion 32 with a looped portion 33 which is offset inwardly as shown in FIGURE 2. The handle 11 is actuated by the fourth and fifth fingers and is grasped in the loop 33 near the first joints of those fingers. The return portion 34 of the loop 33 provides a support area for the fourth as well as the third finger to give upward support to the clippers and to help position and control them. The transverse portion 31 of handle 11 is provided in order to give freedom of movement to the index finger and third finger so that the fruit may be grasped with the thumb and index finger and/or the third finger and then the clipper actuated without hitting said fingers.

Figure 3:
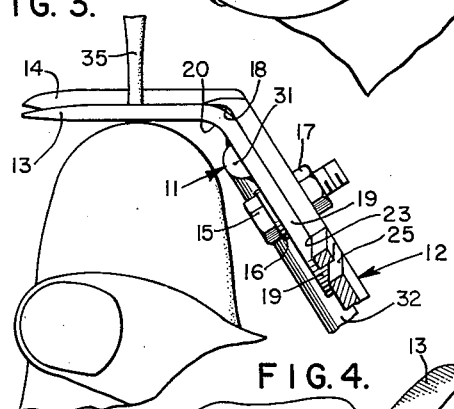
FIGURE 3 is a partial side elevation showing the inclined blades and the fingers grasping the fruit.

The angle to which the blades 13 and 14 are bent will be different for various type of fruit. For an avocado or a pear the angle as shown in FIGURE 3 allows the blades to meet the stem 35 perpendicularly while the handles of the clipper extend away from the fruit so it is not bruised by the clippers. However, if the handles project away from the fruit too abrutly, the fruit would be difficult to grasp. For wider fruit such as grapefruit, the handles should project away a little more. The blades may also be contoured, concave or convex for fruits such as citrus.

Figure 5:
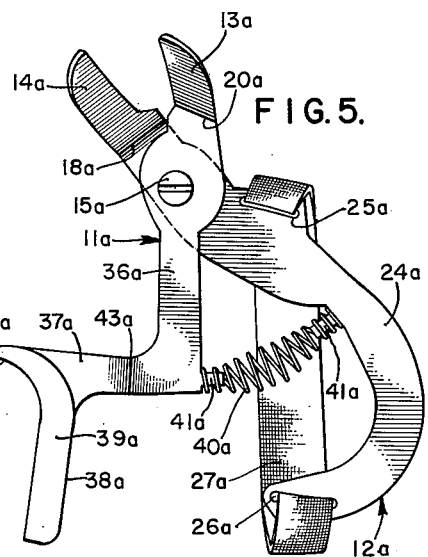
FIGURE 5 is a plan view of a modified form of fruit clippers.

FIGURE 5 shows a modified form of clipper, primarily having a different pivotal member or handle 11a. Rather than having a transverse portion passing over the index and third fingers, the modified clipper handle has a downwardly extending section 36a and a laterally extending section 37a with another downwardly extending portion 38a formed therewith. The fingers engage portion 38a to actuate the clippers and a grip 39a is provided thereon. The index finger and the third finger are placed over and around this offset portion of the handle and the fruit is grasped in the same manner as hereinabove described. This configuration is particularly advantageous when large citrus fruits are picked, as the width of the fruit and therefore the separation of the thumb and opposing fingers can be quite large without interfering with the movement of the handles. The return spring 40a is of the coil type herein and the same could equally well be adapted to use on the preferred embodiment, FIGURE 1. The lugs 41a on the two handles retain the spring in the proper position. The transverse section 37a provides a support area for the third finger and the curved projection 42a provides a support area for the fourth finger. These surfaces facilitate positioning and control of the clippers analogous to return portion 34 of the preferred device. The transverse section 37a is bent inwardly at 43a, as is the loop 33 of the preferred device (see FIGURE 2) so that the portion 38a may be engaged by the fourth and fifth fingers near the first joints thereof.

While particular embodiments of the present invention have been shown and described, it will be obvious to those skilled in the art that changes and modifications may be made without departing from this invention in its broader aspects and, therefore, the aim in the appended claims is to cover all such changes and modification as fall within the true spirit and scope of this invention.

I claim:

1. A hand held device for clipping fruit comprising a pair of pivotal members and a pair of cutting blades extending therefrom at an angle to said members, one of said members having a portion for engagement by the palm of the hand, the other of said members having a descending portion and means connected to said descending portion for engagement by the fourth and fifth fingers, the thumb and the index finger thus being free to grasp the fruit while clipping the stem thereof.

2. A hand held device for clipping fruit comprising a pair of pivotal members and a pair of cutting blades extending therefrom, said cutting blades formed at an angle with the plane of motion of said pivotal members, one of said members having a portion for engagement by the palm of the hand, the other of said members having a descending portion and a loop connected to said descending portion for engagement by the fourth and fifth fingers and a transversely offset portion adapted to pass around the index and third fingers, the thumb and the index finger thus being free to grasp the fruit while clipping the stem thereof.

3. A hand held device for clipping fruit comprising a pair of pivotal members and a pair of cutting blades extending therefrom, said cutting blades formed at an angle with the plane of motion of said pivotal members, one of said members having a portion for engagement by the palm of the hand, the other of said members having a descending portion and a loop connected to said descending portion for engagement by the fourth and fifth fingers and a transversely offset portion adapted to pass around the index and third fingers, the thumb, the index and the third fingers thus being free to grasp the fruit while clipping the stem thereof.

4. A hand operated device for clipping fruit comprising a pair of pivotal handles and a pair of cutting blades formed integrally therewith at an angle with the plane of motion thereof, one of said handles having a curved portion for engagement by the palm of the hand, the other of said handles having a descending portion and a loop connected to said descending portion for engagement by the fourth and fifth fingers and a transversely offset portion adapted to pass around the index and third fingers, the thumb and the index finger thus being free to grasp the fruit while clipping the stem thereof by bringing the said handles together and a resilient return means attached between said handles.

5. A hand operated device for clipping fruit comprising a pair of pivotal handles and a pair of cutting blades formed integrally therewith at an angle with the plane of motion thereof, one of said handles having a curved portion for engagement by the palm of the hand, said handle further adapted to receive a holding strap for engagement with the hand, the other of said handles having a descending portion and a loop connected to said descending portion for engagement by the fourth and fifth fingers and a transversely offset portion adapted to pass around the index and third fingers, said loop having a return portion adapted to be engaged by the third and fourth fingers thereby facilitating control of the device, said loop being formed at an angle to the plane of motion of said handles so that the fourth and fifth fingers may grasp said loop near the first joints thereof, the thumb and the index fingers thus being free to grasp the fruit while clipping the stem thereof by bringing the said handles together and a resilient return means attached between said handles.

6. A hand operated device for clipping friut comprising a pair of pivotal handles and a pair of cutting blades formed integrally therewith at an angle with the plane of motion thereof, one of said handles having a curved portion formed at an angle to the plane of motion thereof and fitting into the palm of the hand so as to be actuated by the heel of said hand, a holding strap for engagement with the hand secured to said handle and positioned to form a cord across said curved portion, the other of said handles having a descending portion and a loop connected to said descending portion for engagement by the fourth and fifth fingers and a transversely offset portion adapted to pass around the index and third fingers, said loop having a return portion adapted to be engaged by the third or fourth finger thereby facilitating control of the device, said loop being formed at an angle to the plane of motion of said handles so that the fourth and fifth fingers may grasp said loop near the first joints thereof, the thumb, the index and the third fingers thus being free to grasp the fruit while clipping the stem thereof by bringing the said handles together and a resilient return means attached between said handles.

7. A hand held device for clipping fruit comprising a pair of pivotal members and a pair of cutting blades extending therefrom at an angle with the plane of motion thereof, one of said members having a curved portion adapted to fit in the palm of the hand, the other of said members having a descending portion and a lower transversely offset portion integral therewith adapted to be engaged by the fourth and fifth fingers, said descending portion allowing the index and third fingers to be positioned thereover, the thumb and the index finger thus being free to grasp the fruit while clipping the stem thereof.

8. A hand held device for clipping fruit comprising a pair of pivotal members and a pair of cutting blades extending therefrom at an angle with the plane of motion thereof, one of said members having a curved portion adapted to fit in the palm of the hand, the other of said members having a descending portion and a lower transversely offset portion integral therewith adapted to be engaged by the fourth and fifth fingers, said descending portion allowing the index and third fingers to be positioned thereover, the thumb, the index and the third fingers thus being free to grasp the fruit while clipping the stem thereof.

9. A hand operated device for clipping fruit comprising a pair of pivotal handles and a pair of cutting blades extending therefrom at an angle with the plane of motion thereof, one of said handles having a curved portion adapted to fit in the palm of the hand, said handle adapted to receive a holding strap for engagement with the hand, the other of said handles having a descending portion and a lower transversely offset portion integral therewith adapted to be engaged by the fourth and fifth fingers, said descending portion allowing the index and third fingers to be positioned thereover, the thumb, the index and the third fingers thus being free to grasp the fruit while clipping the stem thereof by bringing the said handles together, and a resilient return means attached between said handles.

10. A hand operated device for clipping fruit comprising a pair of pivotal handles and a pair of cutting blades extending therefrom at an angle to the plane of motion thereof, one of said handles having a curved portion adapted to fit in the palm of the hand, said handle adapted to receive a holding strap for engagement with the hand, the other of said handles having a descending portion, a laterally extending section and a second descending portion integral therewith, said lateral section providing a support area for the third finger to facilitate control of the device and said section further provided with a projection providing a support for the fourth finger, said lateral section formed at an angle to the plane of motion of said handles so that the said second descending portion may be grasped by the fourth and fifth fingers near the first joints thereof, said descending portion allowing the index and third fingers to be positioned thereover, the thumb, the index and the third fingers thus being free to grasp the fruit while clipping the stem thereof by bringing the handles together, and a resilient return means attached between said handles.

References Cited in the file of this patent
UNITED STATES PATENTS

| | | |
|---|---|---|
| 354,363 | Titus | Dec. 14, 1886 |
| 2,540,255 | Graves | Feb. 6, 1951 |